United States Patent

[11] 3,566,233

[72] Inventors Alan Richard Kahn
Cherry Hill;
Louis Ciro Cosentino, West Paterson, N.J.
[21] Appl. No. 769,150
[22] Filed Oct. 21, 1968
[45] Patented Feb. 23, 1971
[73] Assignee Hoffmann-La Roche Inc.
Nutley, N.J.

[54] METHOD AND APPARATUS FOR MEASURING IMPEDANCE OF A CONDUCTING MEDIUM WITH A CALIBRATED PROBE
6 Claims, 8 Drawing Figs.
[52] U.S. Cl. .................................................. 324/71,
73/190, 128/21, 324/64
[51] Int. Cl. ........................................................ G01n 27/00
[50] Field of Search............................................ 324/64
(DP), (P), 10, (Inquired); 324/29, 30, 30 (A),
106, 71; 73/15, 190 (HF); 340 (HF); 204/195;
128/21, 205, 206

[56] References Cited
UNITED STATES PATENTS
| 3,263,167 | 7/1966 | Foster et al. | 324/61 |
| 3,217,538 | 11/1965 | Loeb | 73/190 |
| 3,302,106 | 1/1967 | Shaw | 324/62 |

*Primary Examiner*—Edward E. Kubasiewicz
*Attorneys*—Samuel L. Welt, Jon S. Saxe, Bernard S. Leon and Jacob Frank ABSTRACT: A technique and apparatus for measuring a quantity in a field associated with the transport of energy in a medium by introducing a transducer bearing probe to the medium, employing an external active energy source and externally adjusting the energy transport between relatively fixed transducers on the probe, and controlling said energy source by way of a new quantity in the field detected after the probe disturbance to restore the field to its nondisturbed condition enabling a precise measurement to be made.

3,566,233

METHOD AND APPARATUS FOR MEASURING IMPEDANCE OF A CONDUCTING MEDIUM WITH A CALIBRATED PROBE

This invention relates in general to an improved technique and apparatus for measuring electrical characteristics of a medium such as biological tissues and solutions and more specifically to the measurement of such electrical characteristics as impedance and current density of the medium.

It is well known that in the area of biophysics numerous approaches have been exhausted in the attempt to arrive at a suitable method for the determination of naturally or externally produced current densities through a specific volume of tissue. Such a measurement technique would be of significant value in many areas of biophysics, for example, the distribution of current in the brain produced by externally applied electric fields is not precisely known whereby knowledge of this current distribution would help localize the specific regions of the brain responsible for observed behavioral effects. Another advantage of such a measurement technique would be the ability to determine the impedance of tissue which some believe can be correlated with other basic functions of the organism.

Classical impedance measuring techniques are frustrated by the high impedance of the electrode-solution interface and the uncertainty of its value which has been defined by many as electrode polarization. Numerous brain impedance studies have been performed utilizing a four-electrode technique, which lessens the electrode impedance problem. However, this method is subject to other limitations such as the inability to rigorously define current density since the area through which the measured current flows is indeterminate, and thereby comprises its usefulness and applicability to current density measurement. In effect, other workers in this field have not specified the area over which the current is distributed nor have they taken into account the degree of distortion of the original current distribution.

In general, the present invention comprises a technique and apparatus which are independent of electrode polarization phenomena which contemplates immersing a pair of current electrodes in a conducting medium in which current is flowing, and externally adjusting the current flow between the electrodes so that the medium is not disturbed by the introduction of the electrodes by producing the same current density through the conducting medium that existed prior to the electrodes being present. By measuring the external current flow between the electrodes, the total current passing through the equivalent volume of medium which has been displaced by the electrodes can then be determined. If the potential gradient between the two electrodes is also measured, the impedance of the conducting medium which has been displaced by the conductors can be calculated. It should also be understood that the technique may be similarly employed in measurement of energy characteristic other than electrical, such as heat.

Other objects, advantages and capabilities of the present invention will become apparent from the following detailed description taken in conjunction with the accompanying drawings showing only preferred embodiments of the invention.

Figure 5:
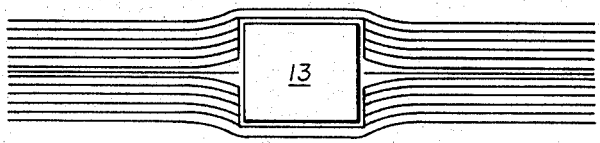
Figure 6:
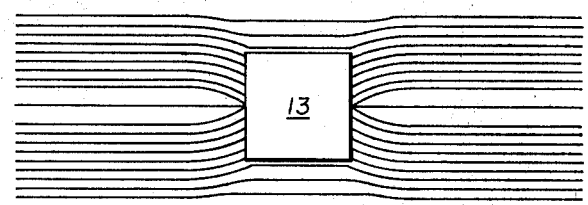
Figure 7:
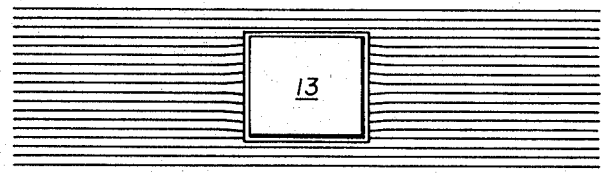

FIGS. 5, 6, and 7 shows varied plots of current density in a medium with which the present invention may be employed.

Figure 8:
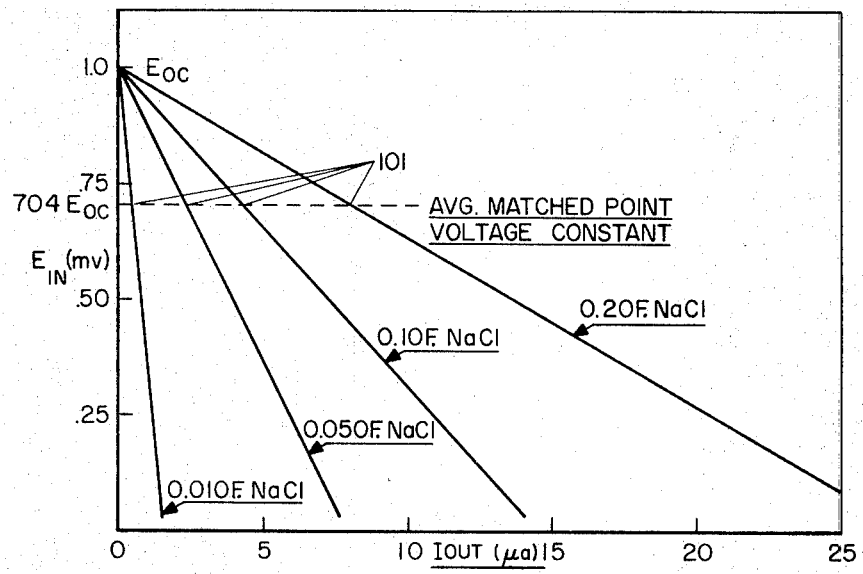

FIG. 8 is a plot of E versus I for a given probe in different concentrations of a solution.

Figure 1:
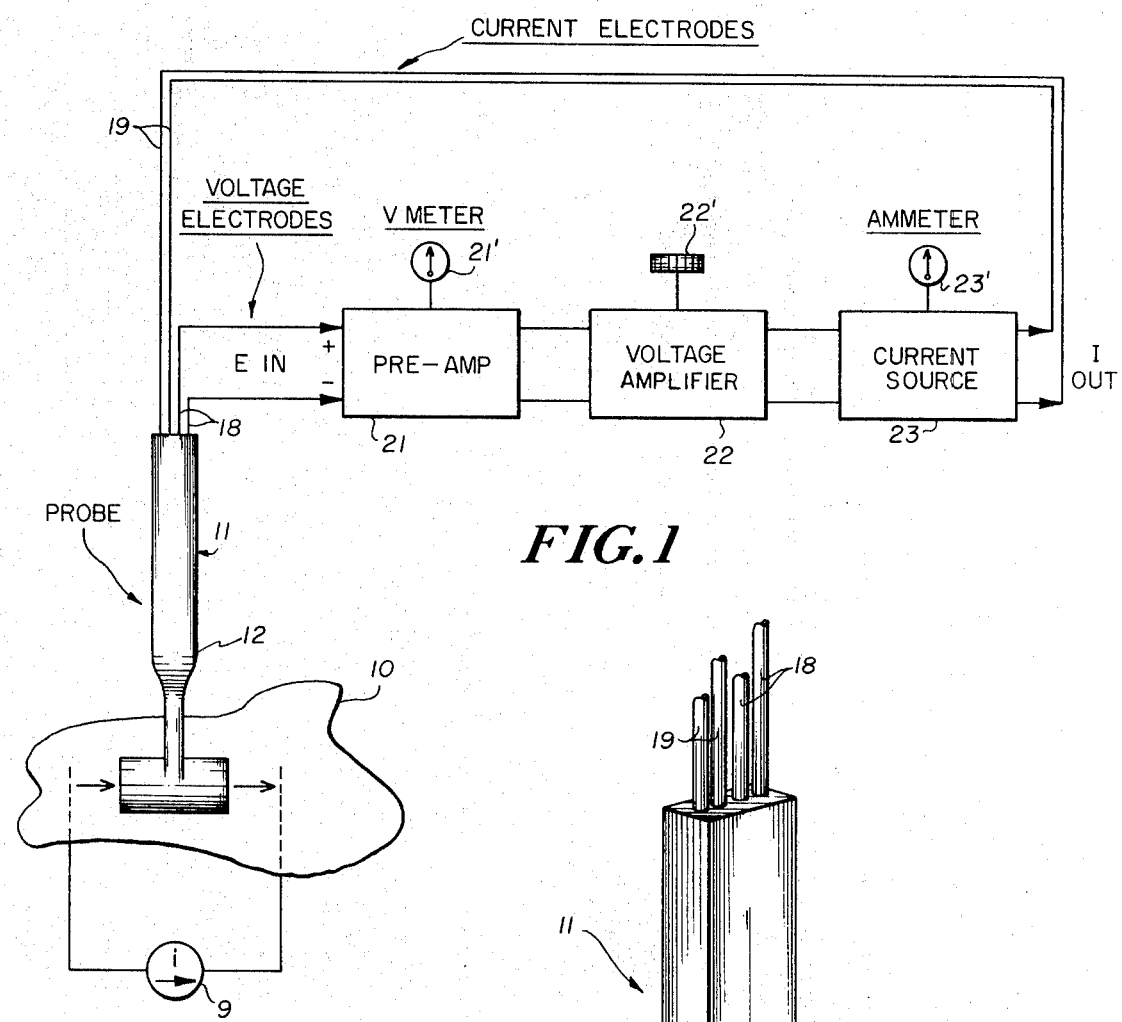
FIG. 1 is a block diagram showing an embodiment for measuring an electrical characteristic of a medium in accordance with the present invention.
Figure 2:
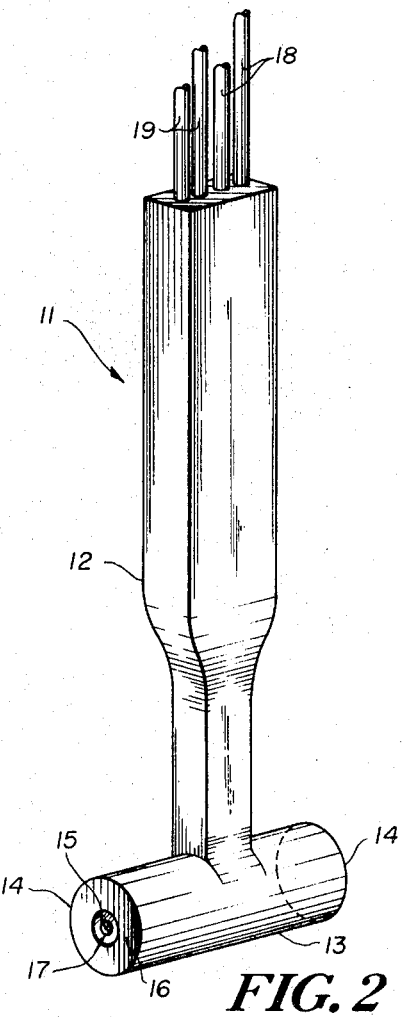
FIG. 2 is a more detailed view of the particular probe illustrated in FIG. 1.

Referring now to the drawings, there is shown in FIG. 1, a preferred embodiment of the present invention comprising a probe 11 which, as illustrated in FIG. 2 is made of an elongated rectangular bar 12, integrally secured to an epoxy cylinderlike body 13 of known length L having pair of end faces 14 of a known area A. Secured to each of the end faces is an infinitesimal centrally located voltage electrode 15 and a spaced concentric current electrode 16 the area of which for all practical purposes is equivalent to the known area A, the latter electrodes 15 and 16 being insulated from one another by an infinitesimal ring 17 of an epoxy medium. Both current electrodes are constructed of silver, silver chloride pellets. The voltage electrodes 15, made of chlorodized silver wire, are connected to a pair of leads 18 by way of a conductor such as chloridized silver wire, and similarly current electrodes 16 are connected to a pair of leads 19, both pairs of leads 18 and 19 emerging from the top of probe 11. Insulation such as ceramic tubes are employed to insulate the leads within members 12 and 13 directed from the voltage and current electrodes to shielded cable leads 18 and 19.

As depicted, cylindrical head 13 of the probe is immersed in a conducting medium 10 which might be living tissue, a solution or other inorganic medium, whereby 9 represents current flow either externally applied to the medium, or already internally existing within the medium at any given moment, or a combination of the two.

The voltage electrode output leads 18 are connected to a preamplifier 21, the input differential voltage of which is displayed on a voltmeter 21', then to a conventional voltage amplifier 22 having an adjustable gain control 22', and then to a current source 23 the output of which is displayed on an ammeter 23', and thence connected to current electrode input leads 19 to complete the loop.

The preamplifier employed is designed to have a high input impedance and a very high common mode rejection ratio, for example $10^6$ at 100 cycles and to provide a differential voltage output with a differential voltage input. It is desirable to have the high input impedance to the differential voltage amplifier so that virtually no current will be drawn, thereby practically eliminating electrode polarization contributions.

CIRCUITRY DESCRIPTION

Figure 3:
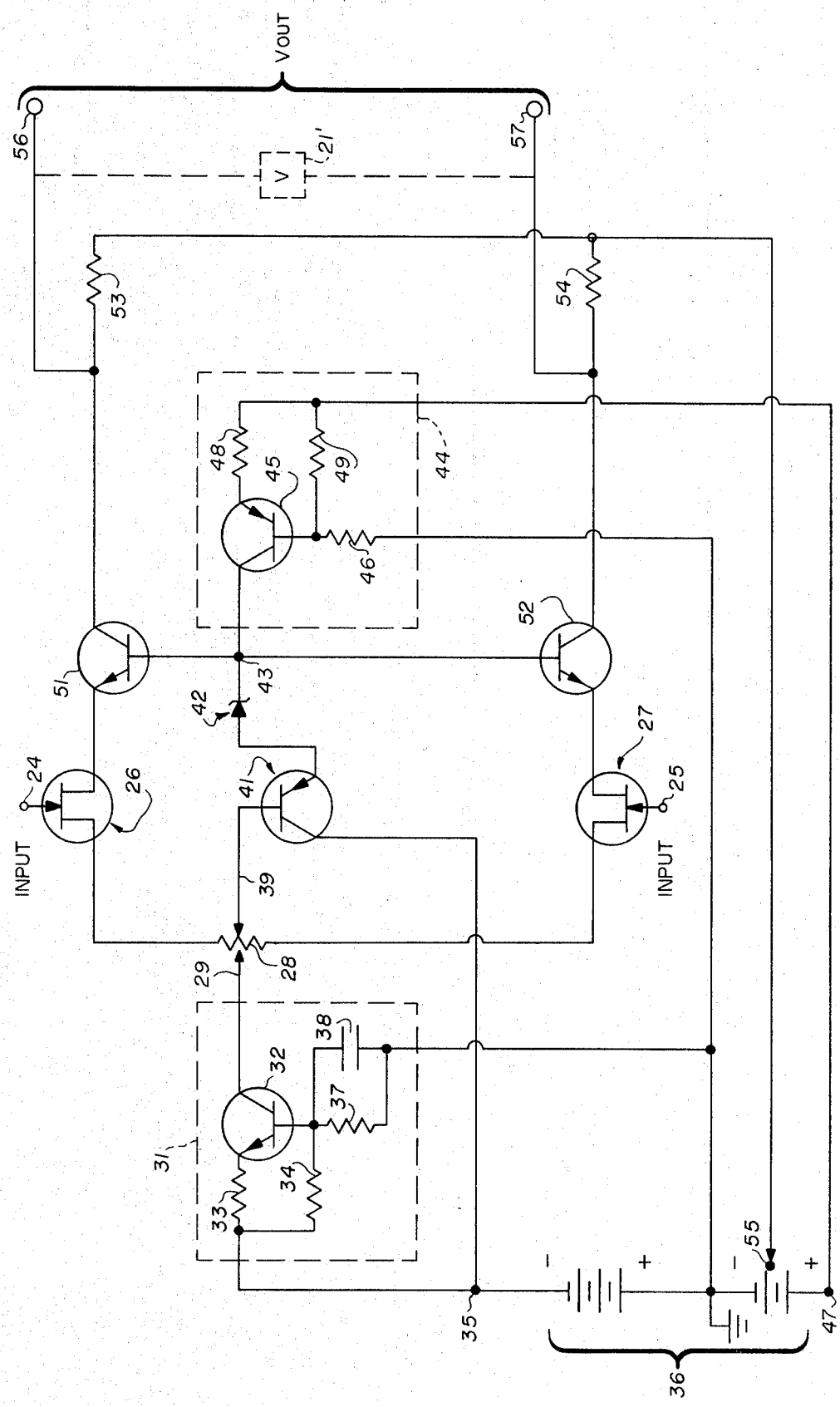
FIG. 3 is a schematic circuit diagram of one form of preamplifier 21 depicted in FIG. 1.

A preferred embodiment of preamplifier 21 is shown in FIG. 3 where leads 18 from the voltage electrodes are connected to terminal points 24 and 25 tied to the gate contact of N channel field effect transistors 26 and 27 respectively, which provide high input impedance. The source contacts of FETs 26 and 27 are connected to opposite ends of a potentiometer 28 tapped about its midpoint by way of wiper 29 for connection with a current source 31 for the FET source contacts. Wiper 29 is connected to the collector of NPN transistor 32 of current source 31. Resistors 34 and 37 form a voltage divider that sets the emitter voltage of T32 to provide a given collector current. Current source 31 presents a very high impedance pathway to any common mode signals.

Additionally, connected to potentiometer 28 is a wiper 39 coupled to the base of a PNP transistor 41. The emitter of T41 is connected by way of Zener diode 42 to terminal point 43. As may be readily observed Zener diode 42 though the medium of T41 will serve as a battery by regulating the voltage at a constant value intermediate terminal point 43 and the wiper 39 at potentiometer 28 by varying its collector current in accordance with the voltage variance at the base of T41. Therefore, the drain contact potentials of FETs 26, 27 closely follow their gate potential to virtually eliminate the effect of drain to gate capacitance as a shunt to the input.

A second current source generally represented within the dashed block 44 includes a PNP transistor T45. R46 and R49 together form a voltage divider that sets the emitter voltage of T45 to provide bias current for T51 and T52. Similar to T32, T45 appears as a high impedance to the signal at terminal point 43.

Terminal point 43 is further coupled to the vase of NPN transistors 51 and 52, the emitter of which are respectively connected to the drain contacts of FETs 26 and 27. Intermediate each T51, R53, and T52, R54 are a pair of terminals 56, 57 respectively, across which the output voltage of preamplifier 21 is obtained.

Assuming that in the above-described differential preamplifier, TIS25's are used for FETs 26, 27; 2N3565 is employed for T32; 2N3638A is utilized for T41 and T45; 2N4100 are used for T51 land T52; and 12Vln759 is employed for Zener diode 43; then values for some resistors and at the voltage terminal for providing a CMRR at 1 kHz. of 50,000:1, a gain of approximately 4 and a high input impedance might be as follows:

| Resistors | Ohms |
|---|---|
| R28 | 5 |
| R53 | 1.96K |
| R54 | 1.96K |

| Terminal Points | Volts |
|---|---|
| 35 | −15 |
| 55 | +20 |
| 47 | +30 |

In operation of the preamplifier, by way of wiper 29 the circuit is first set so that, absent any voltage input to gates 24, 25 of the FETs, the reading of voltmeter 21' should be at zero to provide common mode rejection. As an AC common mode signal from probe 11 is fed to the gates 24, 25, the current is increased to each emitter of T51, T52 to in turn increase the current at their collectors to provide a corresponding output voltage change across terminals 56, 57 which will be reflected by voltmeter 21'. As already noted the output of preamplifier 21 is fed to voltage amplifier 22 which latter amplifier might have a maximum adjustable gain factor of, for example, to about 100. The output of amplifier 22 is then coupled to a differential current source 23, a detailed embodiment of which may be best described with reference to FIG. 4.

Figure 4:
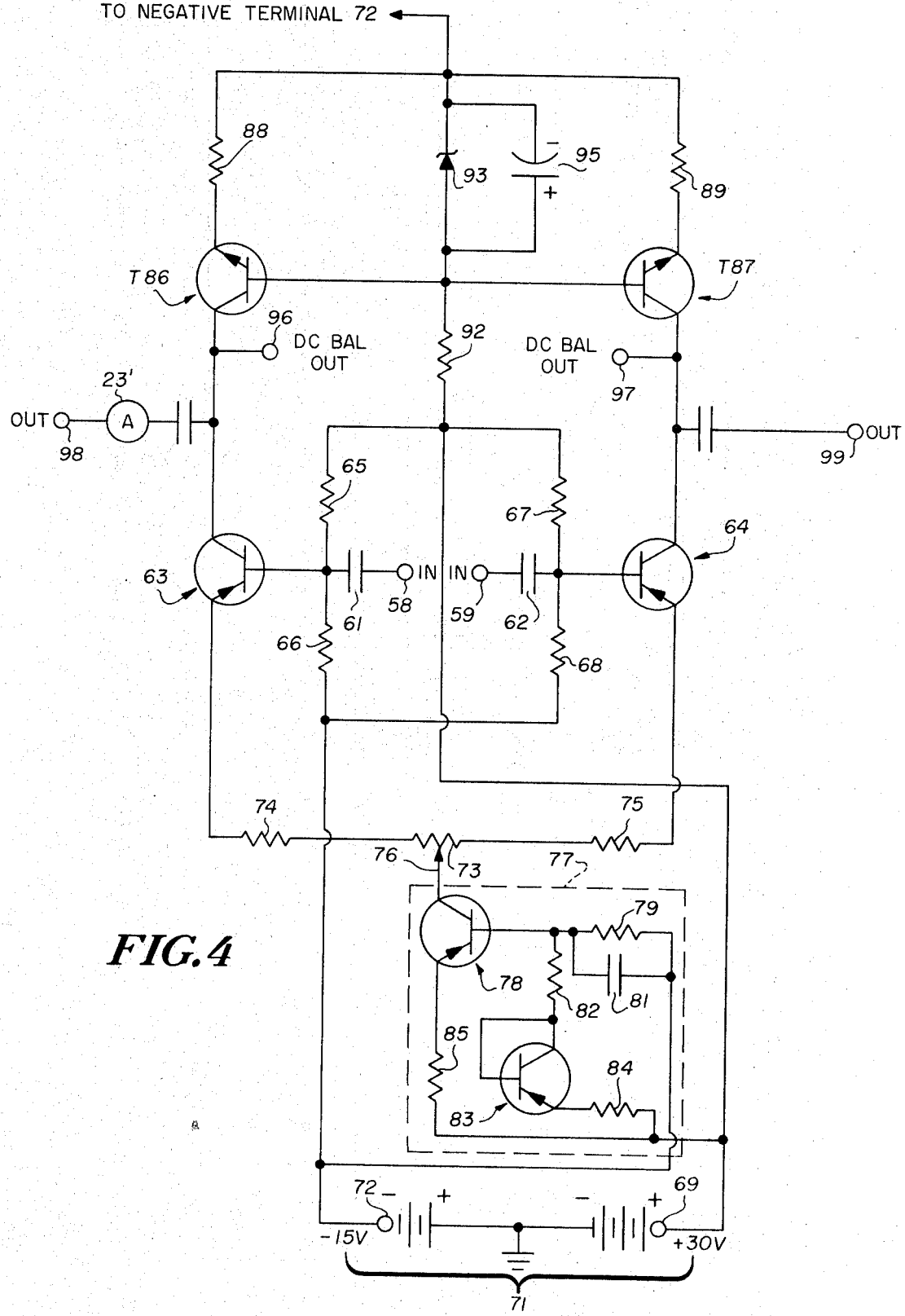
FIG. 4 is a schematic circuit diagram of one form of current source 23 illustrated in FIG. 1

With regard to FIG. 4 there is shown a pair of input terminals 58, 59 across which the output voltage of amplifier 22 is imposed. Terminals 58, 59 are coupled via C61 and C62, respectively, to the base of PNP transistors 63, 64. Connected intermediate C61, T63 and C62, T64 are a pair of voltage dividers respectively comprising resistors 65, 66 and 67, 69. As illustrated, the aforementioned voltage dividers are adjustable and provide fixed bias voltages in addition to the input signals, if any, at the base of T63 and T64. The emitters of T63, T64 are severally coupled to opposite ends of a low value resistor 73 by way of relatively higher value resistors 74 and 75 respectively. Resistor 73 is tapped by a wiper 76 connected to a current source generally designated dashed line 77 which comprises a PNP transistor 78 the base of which is coupled to a suitable bias network, Included in the bias network and coupled to the base of T78, are R82, T83 and R84 connected in series, whereby T83 is employed for providing thermal stability in the current source. As may be observed, with the voltage divider, the emitter voltage of T78 is set, and a constant current supply of predetermined value will be supplied to the emitters of T63 and T64 via wiper 76.

The collectors of T63 and T64 are severally coupled to the collectors of T86 and T87 the latter transistors having their emitters connected though equal valued resistors 88 and 89, respectively to negative supply terminal 72. The bases of T86 and T87 are coupled to common through one path by way of R92 to positive terminal 69 and through another path by way of Zener diode 93 connected in parallel with C95, to negative terminal 72, which latter circuitry establishes T86 and T87 as fixed current sources.

In operation of the particular current source unit 23 described with reference to FIG. 4, by way of terminal points 96 and 97, across which a DC voltmeter may be placed, and absent any input, the wiper 76 is adjusted to provide a zero or center reading on the voltmeter to balance out the circuit. The differential input signal is applied across input terminals 58 and 59, the amount of current passing through the load represented by the voltmeter will depend upon the AC differential signal and will appear at the output terminals 98, 99.

Assuming that in the above-described differential current source 2N335C's are used for T63, T64; 2N4100's are employed for T86, T87; 2N3638A's are utilized for T78, T83; and 1N658 is employed for Zener diode 93; then values for the resistances, capacitances and at the voltage terminals might be as follows:

| Resistors | Ohms |
|---|---|
| R65, R67 | 22.5K |
| R66, R68 | 26.K |
| R74, R75 | 2.61K |
| R73 | 100 |
| R88, R89 | 8.6K |

| Capacitors | Farads |
|---|---|
| C61, C62 | 0.1uF |
| C95 | 15 uf |

| Battery Terminals | Volts |
|---|---|
| 72 | −15 |
| 69 | +30 |

Basically, what has been described with reference to FIG. 1 is a system founded on a technique for the measurement of current and impedance in an electron or ion conducting medium. In effect by way of probe 11, when inserted in conducting medium 10, the differential voltage present at the probe area is measured by preamplifier unit 21, and by use of an adjustable gain amplifier unit 22 the gain of the differential voltage is regulated to drive current source 23 to offset the distribution of medium 10 at the location where the probe is initially placed. The adjusted current derived from the current source is a fair proximity of the total current through a specified area of the medium, which specified area may be accounted for by knowledge of the probe geometry. However, to have an appreciation for the approximate voltage differential value to drive the current source, the probe employed must be first calibrated as will be explained hereinafter.

PROBE CALIBRATION

It is, of course, understood that each probe employed for measurement of current distribution in any one medium will have an impedance value that will vary not only from the impedance of a conducting medium with which it is to be employed but also will vary from results obtained by use of any other probe for the same given conducting medium. Such variations are a consequence of many factors such as probe geometry, etc. Accordingly, any one probe prior to being utilized, must first be analyzed to determine its absolute accuracy and sensitivity. Naturally, the electronic instrumentation associated with the probe must also be and is assumed to be accurate and stable.

What in effect is desired in calibration of the probe may be best illustrated with reference to FIGS. 5, 6 and 7, depicting with different given conditions plots of current density around the cylindrical head 13 of the probe when placed in a known uniform current density. FIG. 5 visualizes a plot of current density in the vicinity of the probe with no external current feedback, where FIG. 6 shows a plot of current density in the vicinity of the probe with maximum external current feedback occuring when a maximum or exceedingly large differential voltage is applied to current source unit 23 in FIG. 1. FIG. 7, as may be observed displays the desired result or a uniform current density in a medium in the vicinity of the current probe so as not to be affected by the presence of the probe. This latter result is attained when the external current feedback from current source 23 is such that the effective probe impedance is matched to the impedance of the medium.

As a result of experimental testing, probe calibration has been found to be achieved in the following manner. The probe head (i.e., that shown in FIG. 2), having a fixed probe geometry, is immersed in a known solution of known conductivity, and a graphic plot, displayed in FIG. 8, of $E_{in}$ at potential electrodes 15 versus $I_{out}$ through current electrodes 16, is made for each solution. Curves for the four solutions of sodium chloride, which curves are normalized to an Eoc (open circuit) of 1 millivolt for clarity were found to be a family of straight lines whose slope increases as the concentration of salt decreases. The general equation of each resulting straight line is $y = mx + b$ or 1. $F_{in} = P\, I_{out} + Eoc$ where Eoc equals the open circuit voltage with no current feedback.

In the direction normal to the probe head end faces, the cylindrical head exhibits a finite resistance distributed over the area A. Its behavior can be described as a homogeneous volume conductor of specific impedance $$\rho s = \frac{A Z_m}{L} \quad \text{or}$$

2. $Z_m = \rho s \dfrac{L}{A}$ in the direction along its axis for the length L of the cylindrical head. If its specific impedance $\rho s$ is made equal to the specific impedance of the solution by the proper choice of $Z_m$, the cylindrical head does not disturb the original current distribution. Thus, for each solution, the theoretical value of impedance, for which the apparent specific impedance of the probe and the specific impedance of the solution are equal, was calculated. When these points 101 were severally plotted on each of the $F_{in}$ versus $I_{out}$ curves in FIG. 8, they were found to lie approximately along a straight line ($E = K\, Eoc$), where $E$ is the matched point voltage $E_m$, and $K$ is a constant which, for convenience, is defined as the matched point voltage constant. As illustrated by the curves, four runs were taken, each in a different concentration of solution, results of which are shown in the following table, disclosing an average value reduce the voltage across the probe at its potential electrodes to a value less than the open circuit voltage which is equal to the match point voltage constant ($K$) times the open circuit voltage (Eoc). When this is accomplished, the current probe is matched in impedance to the surrounding media 10. By way of the potential at meter 21' and the current value at meter 23' the impedance of the media as well as the current density can be practically measured.

It is understood, of course, that to have nearly exact measurements of current density and impedance, a separate system such as that shown in FIG. 1 might be desirable for each dimension of the probe head. However, for the particular probe head geometry shown in FIG. 1 and 2, the singular system shown was found to be sufficiently accurate. Nevertheless, it should be noted that most any probe geometry i.e., cube, etc. could be successfully employed in the present invention given known values of its geometry and proper electrode placement.

AN ALTERNATE EMBODIMENT

It will be observed that in the embodiment heretofore disclosed apparatus shown was employed for measuring an electrical characteristic of medium 10. However, as previously mentioned, quantities in fields, other than an electrical field such as heat flow, may also be measured by practicing the present invention. For example, in measurement of heat flow in medium 10, a temperature monitoring device, such as a thermistor, might be utilized for the potential electrodes for detecting a potential difference in temperature, whereas the current electrodes could be substituted for by heat generating devices such as heater coils, and where the epoxy medium in the probe head could be constructed of a relatively thermally nonconductive material. It should be understood, of course, that the foregoing disclosure relates to only preferred embodiments of the invention and that numerous modifications or alterations may be made therein without departing from the spirit and the scope of the invention, it is desired, therefore,

TABLE

| Concentration of NaCl | Temp. (° C.) | $Z_m$ | Eoc | Isc | $E_m$ | $I_m$ | Matched point, volt, K |
|---|---|---|---|---|---|---|---|
| 0.20 F | 25.1 | 84.3363 | 3.013 | 84.8 | 2.1219 | 25.1600 | .704 |
| 0.10 F | 23.45 | 165.9897 | 1.940 | 28.1 | 1.3718 | 8.2641 | .707 |
| 0.050 F | 26 | 303.3649 | 6.000 | 47.7 | 4.2278 | 13.9363 | .705 |
| 0.010 F | 23.8 | 1484.6402 | 3.075 | 5.825 | 2.1515 | 1.4492 | .700 | for the match point voltage constant to be .704 for a probe with a length of .340 inches.

AThe major conclusion found was that the electrical behavior of any one given probe was found to be the same regardless of the specific impedance of the medium in which it was immersed. That is to say for any given probe a matched point constant $K$ can be accurately defined for all medium conductivities.

OPERATION

In operation of the present invention a probe 11 of known geometry and having a calculated matched point (voltage or current) constant is immersed in a medium 10, such as tissue, for the purpose of ascertaining energy a quantity in a field associated with the transport of such as electrical energy, radiant energy, heat energy, etc., in medium 10 for diagnostic or other purposes by use of apparatus such as that illustrated in FIG. 1.

Initially, the probe is placed into medium 10 and the open circuit voltage at the potential electrodes is measured. The open circuit voltage measured is that when no feedback current will flow between the current electrodes. By manipulation of gain control 22' at voltage amplifier 22, the feedback current generated by current source 23, is adjusted so as to that only such limitations be placed on the invention as are imposed by the prior art.

We claim:

1. A method for measuring a quantity such as impedance or thermal conductivity between two points spaced a such as tissue which medium is conducting energy such as electrical energy or heat energy except in a space between said probe's points, by providing a probe bearing a pair of transducers separated by a nonconducting body adapted to occupy said space and calibrated in a environment such as a solution having known energy conducting characteristics similar to said medium to provide a probe calibration factor which matches the probe impedance or thermal conductivity to the environment impedance or thermal conductivity immersing the probe in said medium detecting a difference such as potential or temperature, of the medium disturbed by the probe between said two points defined by the transducer-medium interfaces, restoring the disturbed medium to its predisturbed state by externally controlling the probe's impedance or thermal conductivity characteristics in a measurable manner through an active energy source, and measuring said quantity by relating said detected potential of the medium in its predisturbed state to the calibration factor.

2. Apparatus for measuring an electrical quantity such as current, impedance and potential in living tissue conducting current, comprising:

probe means having a first and second set of electrodes and calibrated in terms of the probe's impedance characteristics in a medium such as a solution having known impedance characteristics to provide a calibration factor to match the probe impedance characteristics to the medium impedance characteristics;

means connected with said first set of electrodes for detecting an electrical potential in the tissue between the second set of electrodes at the probe-tissue interface, current producing means connected with said second set of electrodes;

means for controlling an output of said current producing means with the detected potential and in accordance with said calibration factor to provide the probe with an impedance characteristic matched to that of the tissue, and means for measuring said detected potential and the output of said current producing means.

3. Apparatus according to claim 2 wherein:

said detecting means includes voltage amplifier means having a high input impedance and a high common made rejection ratio, and said current producing means is connected from and adapted to be controlled by said amplifier means whereby the output of said current producing means is directly proportional to the voltage output of said amplifier means.

4. Apparatus according to claim 3 wherein:

said first set of electrodes includes a pair of infinitesimal potential electrodes connected to said amplifier means, and said second set of electrodes includes a pair of current electrodes connected with said current producing means.

5. Apparatus for measuring a quantity such as impedance or thermal conductivity between two points spaced in a medium such as tissue which medium is conducting energy such as electrical energy or heat energy comprising:

calibrated probe means bearing adapted for placement at each of said points including a nonconducting body intermediate said transducers which probe has been calibrated in an environment such as a solution in terms of known energy conducting characteristics similar to said medium to provide a probe calibration factor which matches the probe impedance or thermal conductivity to the environment impedance or thermal conductivity;

means connected with said transducers for detecting a difference such as potential or temperature in the medium disturbed by the probe between the transducers at the transducer-medium interfaces;

external energy producing means connected from said detection means and back to said transducers;

means for controlling an output of said external energy producing means with the difference from said detecting means and in accordance from said detecting means with said calibration factor to provide the probe with an impedance or thermal conductivity characteristic matched to that of the medium; and means for measuring said detected difference and the output of said external energy producing means.

6. Apparatus for calibrating a probe for measuring a quantity such as impedance or thermal conductivity between two points spaced in a substance such as tissue which substance is conducting energy such as electrical energy or heat energy comprising:

a medium such as a solution having known energy conducting characteristics which characteristics are similar in type to the substance;

probe means bearing a transducer adapted for placement at each of said points including a nonconducting body intermediate and said transducers and adapted for immersion in said medium;

means connected with said transducers for detecting a difference such as potential or temperature in the medium disturbed the probe between the transducer-medium interfaces; and external energy source means connected from said detecting means and back to said transducers for restoring the probe disturbed medium to its predisturbed state by generating an energy flow such as current or heat flux to match the probe energy conducting characteristics to that of the medium whereby a calibration factor is arrived at by relating said energy flow to said detected difference.

UNITED STATES PATENT OFFICE
CERTIFICATE OF CORRECTION

Patent No. 3,566,233  Dated February 23, 1971

Inventor(s) Alan Richard Kahn et al.

It is certified that error appears in the above-identified patent and that said Letters Patent are hereby corrected as shown below:

Column 6, line 56, "spaced a such as tissue which medium is conducting" should read -- spaced in a medium such as tiss which medium is conducting --; line 58, "said probe's points" should read -- said two points --; lines 65 and 66, "thermal conductivity immersing the probe in said medium detecting a difference" should read -- thermal conductivity, immersing th probe in said medium, detecting a difference --. Column 7, li "interface" should read -- interfaces --; line 40, "bearing adapted" should read -- bearing a transducer adapted --. Colu line 13, "means and in accordance from said detecting means w should read -- means and in accordance with --; line 34, "disturbed the probe" should read -- disturbed by the probe -

Signed and sealed this 31st day of August 1971.

(SEAL)
Attest:

EDWARD M. FLETCHER, JR.
Attesting Officer

WILLIAM E. SCHUYLER, JR
Commissioner of Patents